(12) United States Patent
Wang et al.

(10) Patent No.: US 10,784,062 B2
(45) Date of Patent: Sep. 22, 2020

(54) INGRESS PREVENTION FOR KEYBOARDS (71) Applicant: Apple Inc., Cupertino, CA (US)

(72) Inventors: Paul X. Wang, Cupertino, CA (US);
Zheng Gao, Cupertino, CA (US); Craig C. Leong, Cupertino, CA (US); Robert J. Lockwood, Cupertino, CA (US);
Bryan W. Posner, Cupertino, CA (US);
Robert Y. Cao, Cupertino, CA (US);
Simon R. Lancaster-Larocque, San Jose, CA (US); Dinesh C. Mathew, Cupertino, CA (US); Alex J. Lehmann, Cupertino, CA (US); Denis Endisch, Cupertino, CA (US); Karan Bir, Bangalor (IN)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/259,075

(22) Filed: Sep. 8, 2016

(65) Prior Publication Data
US 2018/0068808 A1 Mar. 8, 2018

(51) Int. Cl.
*H01H 13/14* (2006.01)
*H01H 13/70* (2006.01)
*G06F 1/16* (2006.01)

(52) U.S. Cl.
CPC ........... *H01H 13/14* (2013.01); *G06F 1/1656* (2013.01); *G06F 1/1662* (2013.01); *H01H 13/70* (2013.01); *H01H 2239/034* (2013.01)

(58) Field of Classification Search
CPC ...... H01H 13/705; H01H 13/83; H01H 13/86; H01H 2229/028; H01H 2223/002;
(Continued)

(56) References Cited

U.S. PATENT DOCUMENTS 3,950,627 A 4/1976 Murata et al.
4,500,758 A * 2/1985 Guckenheimer .... H01H 13/702
200/5 A
(Continued)

FOREIGN PATENT DOCUMENTS

CN 102565149 7/2012
CN 104517772 4/2015
(Continued)

OTHER PUBLICATIONS

Author Unknown, "What to Do when Gadgets Get Wet," http://gadgetshow.channel15.com/gadget-show/blog/what-to-do-when-gadgets-get-wet, 2 pages, Aug. 23, 2010.
(Continued)

*Primary Examiner* — Ahmed M Saeed
(74) *Attorney, Agent, or Firm* — Dorsey & Whitney LLP (57) ABSTRACT

Keyboards include mechanisms that prevent and/or alleviate contaminant ingress. In some embodiments, a keyboard assembly includes a substrate, a key cap, a movement mechanism moveably coupling the key cap to the substrate, and a guard structure coupled to the key cap operable to direct contaminants away from the movement mechanism. In other embodiments, a keyboard includes a base; a web that defines apertures; keys moveably coupled to the base within the apertures; and a gasket coupled to the keys, the gasket fixed between the web and the base, operable to block passage of contaminants into the apertures.

18 Claims, 10 Drawing Sheets

(58) Field of Classification Search
CPC ............ H01H 13/702; H01H 13/7006; H01H 2229/044; H01H 2237/004
See application file for complete search history.

(56) References Cited

U.S. PATENT DOCUMENTS

| | | |
|---|---|---|
| 5,041,330 A | 8/1991 | Heerton et al. |
| 5,179,505 A | 1/1993 | Matsuo |
| 5,258,592 A | 11/1993 | Nishikawa et al. |
| 5,373,487 A | 12/1994 | Crawford et al. |
| 5,528,235 A | 6/1996 | Lin et al. |
| 5,642,950 A | 7/1997 | Hochgesang et al. |
| 6,166,662 A | 12/2000 | Chuang |
| 6,292,358 B1 | 9/2001 | Lee et al. |
| 6,389,143 B1 | 5/2002 | Leedom et al. |
| 6,501,036 B2 | 12/2002 | Rochon et al. |
| 6,855,173 B2 | 2/2005 | Ehrnsperger et al. |
| 6,963,039 B1 | 11/2005 | Weng et al. |
| 7,075,781 B2 | 7/2006 | Peng |
| 7,087,850 B1 | 8/2006 | Murzanski |
| 7,230,196 B2 | 6/2007 | Toyama |
| 7,355,137 B2 | 4/2008 | Kawasaki et al. |
| 7,365,281 B2 | 4/2008 | Yamaguchi et al. |
| 7,580,533 B2 | 8/2009 | Schwartz |
| 7,748,272 B2 | 7/2010 | Kranz et al. |
| 7,764,936 B2 | 7/2010 | Nakasano et al. |
| 7,850,378 B1 | 12/2010 | Ligtenberg et al. |
| 7,865,210 B2 | 1/2011 | Wang et al. |
| 8,059,490 B2 | 11/2011 | Rapps et al. |
| 8,092,691 B2 | 1/2012 | Youngs et al. |
| D653,640 S | 2/2012 | Kwon et al. |
| 8,231,795 B2 | 7/2012 | Martin et al. |
| 8,263,886 B2 | 9/2012 | Lin et al. |
| 8,299,601 B2 | 10/2012 | Oka et al. |
| 8,367,928 B2 | 2/2013 | Hsu et al. |
| 8,371,866 B1 | 2/2013 | Su et al. |
| 8,381,575 B2 | 2/2013 | Seo |
| 8,416,542 B2 | 4/2013 | Nakamura |
| 8,446,713 B2 | 5/2013 | Lai |
| 8,462,514 B2 | 6/2013 | Myers et al. |
| 8,470,252 B2 | 6/2013 | Odueyungbo |
| 8,500,348 B2 † | 8/2013 | Dumont |
| 8,482,305 B2 | 9/2013 | Johnson |
| 8,526,175 B2 | 9/2013 | Yukawa et al. |
| 8,562,095 B2 | 10/2013 | Alleyne et al. |
| 8,591,240 B2 | 11/2013 | Jenks |
| 8,614,897 B2 | 12/2013 | Tang |
| 8,624,144 B2 | 1/2014 | Chiang |
| 8,644,011 B2 | 2/2014 | Parkinson |
| 8,683,861 B1 | 4/2014 | Humbert et al. |
| 8,767,381 B2 | 7/2014 | Shukla et al. |
| 8,770,996 B2 | 7/2014 | Hsu |
| 8,800,764 B2 | 8/2014 | Wu |
| 8,804,993 B2 | 8/2014 | Shukla et al. |
| 8,826,558 B2 | 9/2014 | Priebe et al. |
| 8,844,158 B2 | 9/2014 | Dehn |
| 8,942,401 B2 | 1/2015 | Murayama |
| 8,960,818 B2 | 2/2015 | Myers et al. |
| 8,994,827 B2 | 3/2015 | Mistry et al. |
| 9,013,888 B2 | 4/2015 | Trzaskos et al. |
| 9,072,991 B2 | 7/2015 | Winters et al. |
| 9,080,961 B2 | 7/2015 | Adachi |
| 9,084,053 B2 | 7/2015 | Parkins |
| 9,084,357 B2 | 7/2015 | Shedletsky et al. |
| 9,099,264 B2 | 8/2015 | Shedletsky et al. |
| 9,105,420 B2 | 8/2015 | Shah et al. |
| 9,129,757 B2 | 9/2015 | Kanbayashi et al. |
| 9,161,434 B2 | 10/2015 | Merz et al. |
| 9,164,539 B2 | 10/2015 | Wu |
| 9,171,535 B2 | 10/2015 | Abe et al. |
| 9,226,076 B2 | 12/2015 | Lippert et al. |
| 9,240,292 B1 | 1/2016 | Lapetina |
| 9,253,297 B2 | 2/2016 | Abe et al. |
| 9,335,355 B2 | 5/2016 | Menzel et al. |
| 9,363,589 B2 | 6/2016 | Lippert et al. |
| 9,387,647 B2 | 7/2016 | Wei et al. |
| 9,529,391 B2 | 12/2016 | Ely |
| 2003/0169232 A1 | 9/2003 | Ito |
| 2006/0210062 A1 | 9/2006 | DeMichele et al. |
| 2007/0003081 A1 | 1/2007 | Ram et al. |
| 2007/0235296 A1* | 10/2007 | Yoshioka ............ H01H 13/704 200/5 A |
| 2008/0302641 A1 | 12/2008 | Su |
| 2009/0002941 A1 | 1/2009 | Mongia et al. |
| 2009/0281251 A1 | 11/2009 | Bae et al. |
| 2010/0213044 A1* | 8/2010 | Strittmatter ......... H01H 13/702 200/515 |
| 2010/0232861 A1* | 9/2010 | Shibata ................ G06F 1/1662 400/491 |
| 2011/0103621 A1 | 5/2011 | Lutz |
| 2012/0067711 A1 | 3/2012 | Yang |
| 2013/0037396 A1 | 2/2013 | Yu |
| 2013/0043115 A1 | 2/2013 | Yang et al. |
| 2013/0146491 A1 | 6/2013 | Ghali et al. |
| 2013/0170685 A1 | 7/2013 | Oh et al. |
| 2013/0242481 A1 | 9/2013 | Kim et al. |
| 2014/0029206 A1 | 1/2014 | Wittenberg et al. |
| 2015/0003213 A1 | 1/2015 | Suwald |
| 2015/0237764 A1* | 8/2015 | Liu ....................... G06F 1/203 361/679.46 |
| 2016/0052017 A1 | 2/2016 | Weber et al. |
| 2016/0239047 A1 | 8/2016 | Weber |
| 2016/0241945 A1 | 8/2016 | Zadesky et al. |
| 2016/0379767 A1 | 12/2016 | Ely |
| 2017/0025785 A1 | 1/2017 | Song et al. |
| 2017/0094796 A1 | 3/2017 | Lor et al. |

FOREIGN PATENT DOCUMENTS

| | | |
|---|---|---|
| CN | 105049966 | 11/2015 |
| CN | 204906680 | 12/2015 |
| CN | 105323674 | 2/2016 |
| EP | 0799747 | 10/1997 |
| EP | 2326106 | 5/2011 |
| EP | 2640042 | 9/2013 |
| JP | S5620399 | 2/1981 |
| JP | H05265618 A | 10/1993 |
| JP | H08249978 A | 9/1996 |
| JP | 2002216575 A † | 8/2002 |
| JP | 2002279854 A | 9/2002 |
| JP | 200353872 | 2/2003 |
| JP | 2003263257 A | 9/2003 |
| JP | 200483811 | 3/2004 |
| JP | 2004235724 | 8/2004 |
| JP | 2004244607 | 9/2004 |
| JP | 2006331813 A | 12/2006 |
| JP | 2011187297 A | 9/2011 |
| JP | 2011187298 | 9/2011 |
| JP | 2012253426 | 12/2012 |
| WO | WO2012/117476 | 9/2012 |
| WO | WO2015/167848 | 11/2015 |

OTHER PUBLICATIONS

International Search Report and Written Opinion, PCT/US2017/048878, 13 pages, dated Nov. 6, 2017.
European Communication Pursuant to Article 94(3) EPC for European Application No. 17764494.5, dated Oct. 1, 2019 (7 pp.).

* cited by examiner
† cited by third party

INGRESS PREVENTION FOR KEYBOARDS

FIELD

The described embodiments relate generally to keyboards. More particularly, the present embodiments relate to structures that prevent ingress of contaminants such as dust or liquid into keyboards.

BACKGROUND

Electronic devices use a variety of different input devices. Examples of such input devices include keyboards, computer mice, touch screens, buttons, trackpads, and so on. Some input devices may be incorporated into an electronic device. The electronic device may be vulnerable to contaminants, such as dust or liquid, entering though openings or connections in or around one or more incorporated input devices or external input devices. The external input devices may themselves be vulnerable to contaminants entering through various openings or connections.

For example, keyboards typically involve a number of moving keys. Liquid ingress around the keys into the keyboard can damage electronics. Residues from such liquids, such as sugar, may corrode or block electrical contacts, prevent key movement by bonding moving parts, and so on. Solid contaminants (such as dust, dirt, food crumbs, and the like) may lodge under keys, blocking electrical contacts, getting in the way of key movement, and so on.

SUMMARY

The present disclosure relates to keyboards and/or other input devices that include mechanisms that prevent and/or alleviate contaminant (such as dust, liquid, and so on) ingress. These mechanisms may include membranes or gaskets that block contaminant ingress; structures such as brushes, wipers, or flaps that block gaps around key caps; funnels, skirts, bands, or other guard structures coupled to key caps that block contaminant ingress into and/or direct contaminants away from areas under the key caps; bellows that blast contaminants with forced gas out from around the key caps, into cavities in a substrate of the keyboard, and so on; and/or various active or passive mechanisms that drive contaminants away from the keyboard and/or prevent and/or alleviate contaminant ingress into and/or through the keyboard.

In various embodiments, a key includes a foundation, an actuator moveably coupled to the foundation between a depressed position and an undepressed position, and a skirt coupled to the actuator that is configured to form a perimeter around the actuator. The skirt is in contact with the foundation when the actuator is in the undepressed position and in compression between the actuator and the foundation when the actuator is in the undepressed position.

In some examples, the skirt is an elastomer. In some implementations, the skirt may be an elastomer band. The elastomer band may extend from the actuator at an angle between the actuator and the substrate, change the angle at which the elastomer band extends between the actuator and the foundation, extend from all sides of the actuator, define a vent, and be operable to force contaminants into a cavity defined in the foundation using gas forced from the vent.

In various examples, the skirt expands when the actuator moves toward the depressed position. In numerous examples, the skirt forms a seal between the actuator and the foundation. In some examples, the skirt defines a vent skirt defines a vent with dimensions that allow the passage of gas but restrict the passage of liquid.

In some examples, the skirt forces gas through an aperture when the actuator moves toward the depressed position. In various examples, the skirt biases the actuator toward the undepressed position. In some examples, the skirt extends from a side of the actuator at an angle and the angle at which the actuator extends changes when the actuator travels toward the depressed position In numerous embodiments, a keyboard assembly includes a substrate, a key cap, a movement mechanism moveably coupling the key cap to the substrate, and a guard structure extending from the key cap that funnels contaminants away from the movement mechanism. In some implementations, the substrate defines a cavity and the guard structure funnels the contaminants into the cavity.

In various examples, the substrate defines a cavity and the guard structure funnels the contaminants into the cavity. In some examples, the guard structure surrounds the key cap. In numerous examples, the guard structure is rigid, is separated from the substrate when the key cap is in an undepressed position, includes a mouth positioned over a hole in the substrate, and moves with the key cap. In various implementations of such examples, the guard structure does not contact the substrate when the key cap is in a depressed position.

In some embodiments, a keyboard includes a base, a web that defines apertures, keys moveably coupled to the base within the apertures, and a gasket having raised portions coupled to the keys and unraised portions fixed between the web and the base. The gasket is operable to block passage of contaminants into the apertures. Compression of the gasket may force gas through a vent.

In some examples, the gasket is a layer of fabric and a layer of silicone. In various implementations, the unraised portions are coupled to one of the key caps of the keys, a region between outer and inner key caps of the keys, or a movement mechanism of the keys. In various examples, the gasket is a membrane. In numerous examples, the gasket resists depression of the keys. In some examples, the unraised portions include a first region fixed between the web and the base that is coupled to the web and the base and a second region fixed between the web and the base that is uncoupled from the web and the base.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems and apparatuses that embody various elements of the present disclosure. However, it should be understood that the described disclosure may be practiced in a variety of forms in addition to those described herein.

The following disclosure relates to keyboards and/or other input devices that include mechanisms that prevent and/or alleviate contaminant ingress. These mechanisms may include keyboard membranes or gaskets; structures such as brushes, wipers, or flaps in gaps between key caps of the keys; funnels, skirts, elastomer or other bands, or other guard structures coupled to key caps; bellows that blast contaminants with forced gas; and/or various active or passive mechanisms that drive contaminants away from the keyboard and/or prevent and/or alleviate contaminant ingress into and/or through the keyboard.

These and other embodiments are discussed below with reference to FIGS. 1-10B. However, those skilled in the art will readily appreciate that the detailed description given herein with respect to these Figures is for explanatory purposes only and should not be construed as limiting.

Figure 1:
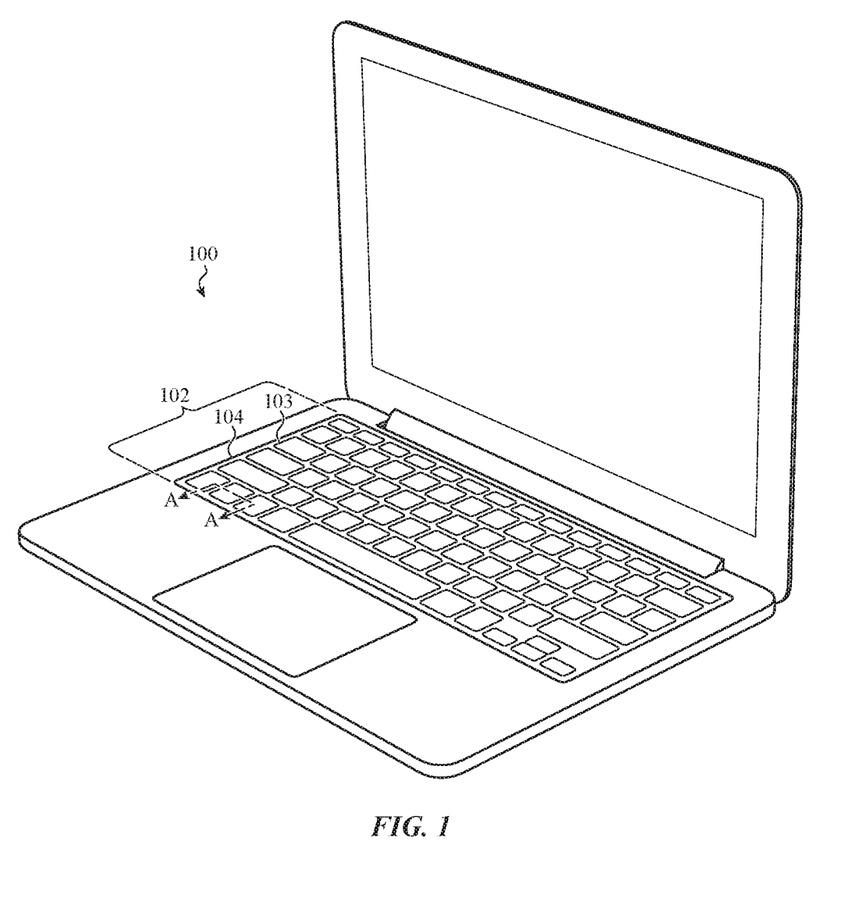
FIG. 1 depicts an electronic device including a keyboard.

FIG. 1 depicts an electronic device 100 including a keyboard 102. The keyboard 102 includes keys or key assemblies with key caps 103 or actuators that move within apertures defined in a web 104. The electronic device 100 includes one or more mechanisms that prevent and/or alleviate contaminant ingress into and/or through the keyboard 102, such as between the key caps 103 and the web 104. Contaminants may include liquids (e.g., water, soft drinks, sweat, and the like), solids (e.g., dust, dirt, food particles, and the like), and/or any foreign material that may ingress into and/or through the keyboard 102.

As described in detail below, one or more various contaminant ingress prevention and/or alleviation mechanisms may be used in one or more embodiments. In some embodiments, the keyboard 102 may include a membrane, gasket, or similar component that blocks contaminant ingress. Structures such as brushes, wipers, or flaps may block gaps around key caps 103 or other actuators in various embodiments. In numerous embodiments, funnels, skirts, elastomer or other bands, or other guard structures coupled to each of the key caps 103 may block contaminant ingress into and/or direct contaminants away from areas under the key caps 103. Bellows mechanisms may blast contaminants with forced gas in some embodiments, such as out from around key caps 103, into cavities in a substrate of the keyboard 102, and so on. In various embodiments, the key caps 103 may contact surrounding structures to block gaps around the key caps 103. In still other embodiments, various active or passive mechanisms may drive contaminants away from the keyboard 102 and/or prevent and/or alleviate contaminant ingress into and/or through the keyboard 102.

Figure 2:
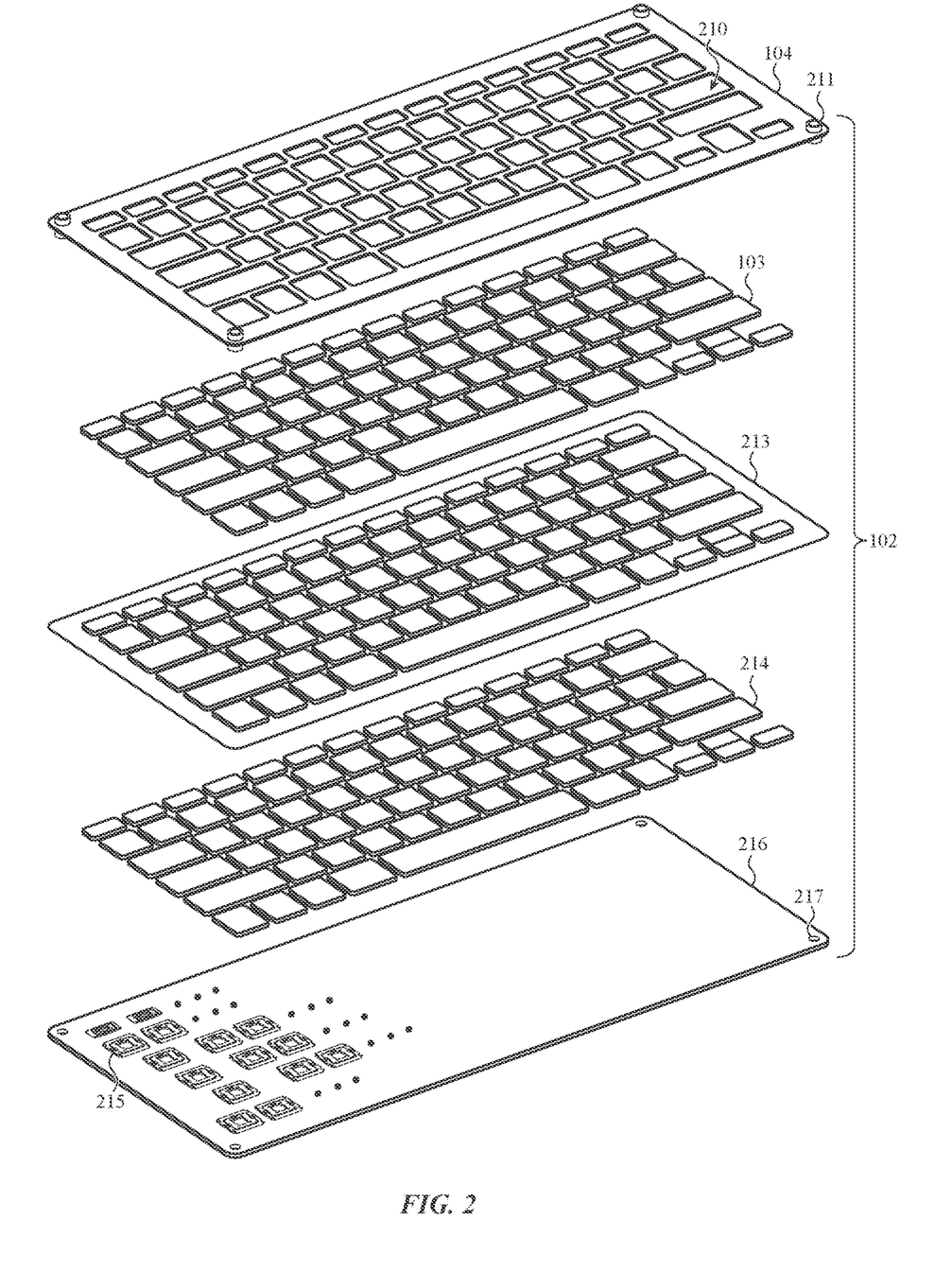
FIG. 2 depicts an example exploded view of the keyboard of FIG. 1.

FIG. 2 depicts an example exploded view of the keyboard 102 or keyboard assembly of FIG. 1. In this example, the keyboard 102 includes a web 104 that fixes a membrane 213, gasket, or the like to a substrate 216, base, foundation, or the like (e.g., a printed circuit board). Keys or key assemblies include movement mechanisms 215 coupled to the substrate 216, inner key caps 214 or actuators coupled to the movement mechanisms 215 on an internal side of the membrane 213, and key caps 103 or actuators disposed in apertures 210 defined by the web 104 on an external side of the membrane 213. The movement mechanisms 215 moveably couple the inner key caps 214 and the key caps 103 to the substrate 216. Key assemblies may also include one or more activation mechanisms (such as one or more switches, capacitive sensors, optical sensors, and the like, which may be included with the movement mechanisms 215) that detect touch to and/or movement of the key caps 103.

The web 104 may be coupled to the substrate 216 using attachment connectors 211 that engage attachment points 217 defined in the substrate 216. For example, the attachment connectors 211 may be screws, bolts, or the like and the attachment points 217 may be threaded apertures and so on. The attachment connectors 211 pass through the membrane 213, coupling the membrane 213 to the web 104 and the substrate 216. Thus, the membrane 213 may not be coupled to the web 104 and/or the substrate 216 at every point where the membrane 213 is fixed to the substrate 216 by the web 104 (e.g., where the web 104 and/or the substrate 216 constrain the membrane 213). A first region of the membrane 213 fixed to the substrate 216 by the web 104 is coupled (the region through which the attachment connectors 211 pass through the membrane 213) whereas a second region of the membrane 213 fixed to the substrate 216 by the web 104 is uncoupled.

However, it is understood that this is an example. In various implementations, the membrane 213 may be coupled in a variety of manners (such as one or more adhesives and so on) to all or portions of the web 104, the substrate 216 (or base, foundation, or the like), the key caps 103, the inner key caps 214, the movement mechanisms 215, and so on.

The membrane 213 blocks and/or restricts contaminants passing into areas of the key assemblies under the membrane 213. For example, the membrane 213 may block ingress of contaminants such as dust or liquid into areas occupied by the inner key caps 214 and/or movement mechanisms 215. As such, the membrane 213 may function as a gasket, sealing internal areas of the keyboard 102 from an external environment.

The membrane 213 may be formed from a variety of different materials. Examples of such materials include fabrics such as nylon, polyester, polyurethane or other elastomers, plastic films, and so on. In various implementations, the membrane 213 may be waterproof and/or water resistant (e.g., resists and/or blocks the passage of water or other liquid). For example, a membrane 213 formed of elastomer may be waterproof. By way of another example, the membrane 213 may include a layer of nylon, polyester, or other fabric coupled to a layer of silicone or other elastomer. By way of still another example, the membrane 213 may be formed of a fabric coated or otherwise treated with a hydrophobic material.

The membrane 213 or gasket may include embossed or raised portions and unembossed or unraised portions in various implementations. Portions of the key assemblies such as the inner key caps 214 and the movement mechanisms 215 may be disposed within these embossed or raised portions rather than the unembossed or unraised portions.

Figure 3A:
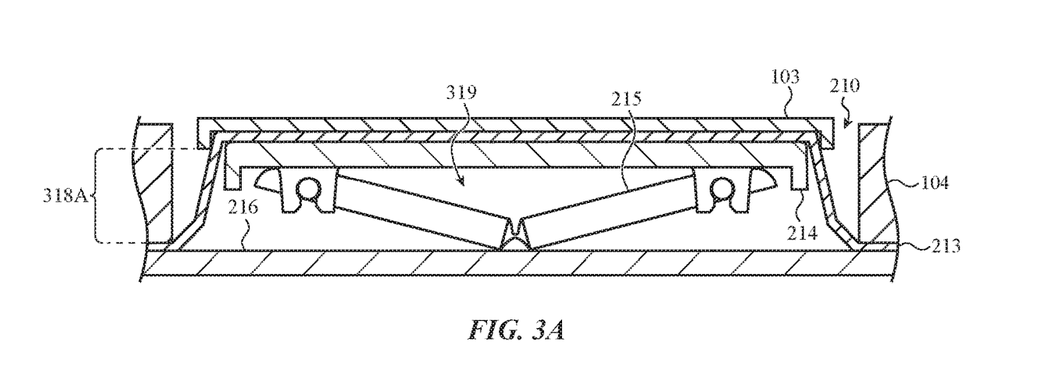
FIG. 3A depicts a first example cross-sectional view of a key assembly of the keyboard of FIG. 1, taken along line A-A of FIG. 1.

FIG. 3A depicts a first example cross-sectional view of a key assembly of the keyboard 102 of FIG. 1, taken along line A-A of FIG. 1. The web 104 fixes the unraised portion of the membrane 213 to the substrate 216 (or base, foundation, or the like). An embossed area or raised portion of the membrane 213 forms an internal area 319 around the inner key cap 214 or other actuator and the movement mechanism 215. The membrane 213 blocks contaminants that enter into a gap between the key cap 103 and the web 104 from ingress into the internal area 319. The key cap 103 is coupled to an exterior surface of the embossed area of the membrane 213. The inner key cap 214 is coupled to an interior surface of the embossed area of the membrane 213. Thus, the embossed area of the membrane 213 is coupled to a region of the key assembly between the key cap 103 and the inner key cap 214.

The movement mechanism 215 has a particular force curve response to force applied to the key cap 103 that moves the key cap 103 from an undepressed position or state towards a depressed position or state. The membrane 213 may affect this force curve response, in some implementations resisting depression of the key cap 103 and/or biasing the depression of the key cap 103 towards an undepressed position. Various characteristics of the membrane 213 may be configured to prevent the membrane 213 from undesirably affecting the force curve response.

For example, the material(s) from which the membrane 213 is formed may alter the force curve response of the key assemblies (such as forming the membrane 213 of elastomer having a greater effect on the force curve response than forming the membrane 213 of fabric). The configuration and/or shape of the embossed areas may also affect the force curve response, as well as any compression and/or tension the movement places the membrane 213 into. The coupling between the membrane 213 and the web 104 and/or the substrate 216 (including the amount of the coupled area, the location of the coupled area, and so on) may further affect the force curve response. One or more of these characteristics, and/or other membrane 213 characteristics, may be configured to prevent the membrane 213 from undesirably affecting the force curve response.

By way of example, the embossed area of the membrane 213 or gasket illustrated in FIG. 3A includes sides 318A. In this example implementation, the sides 318A of the raised portion are sloped between the key cap 103 and the substrate 216 (or base, foundation, or the like) and change direction to form an acute angle (such as an approximately 55 degree or other acute angle) between the key cap 103 and the substrate 216 when the key cap 103 is undepressed. This may form an "angled" edge. In a first alternative example implementation shown in FIG. 3B, the sides 318B of the raised portion of the membrane 213 are sloped between the key cap 103 and the substrate 216 without changing direction to form an angle when the key cap 103 is undepressed. This may form a "drafted edge." In a second alternative example implementation shown in FIG. 3C, the sides 318C of the raised portion of the membrane 213 may be straight and not sloped between the key cap 103 and the substrate 216 when the key cap 103 is undepressed. This may form a "straight edge." The sides 318A may add to the force curve response less than the sides 318B, which may add to the force curve response less than the sides 318C. Thus, the configuration of the sides of the raised portion may be selected to obtain the desired effect on the force curve response.

Figure 3B:
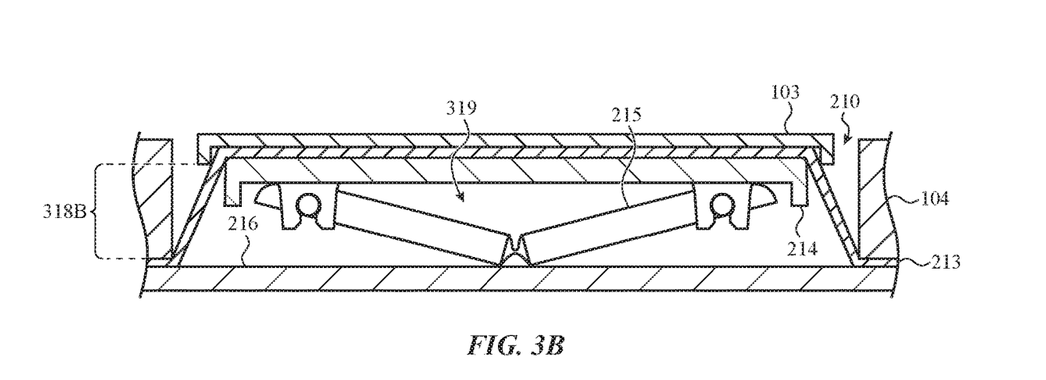
FIG. 3B depicts a first alternative example of the key assembly of FIG. 3A.
Figure 3C:
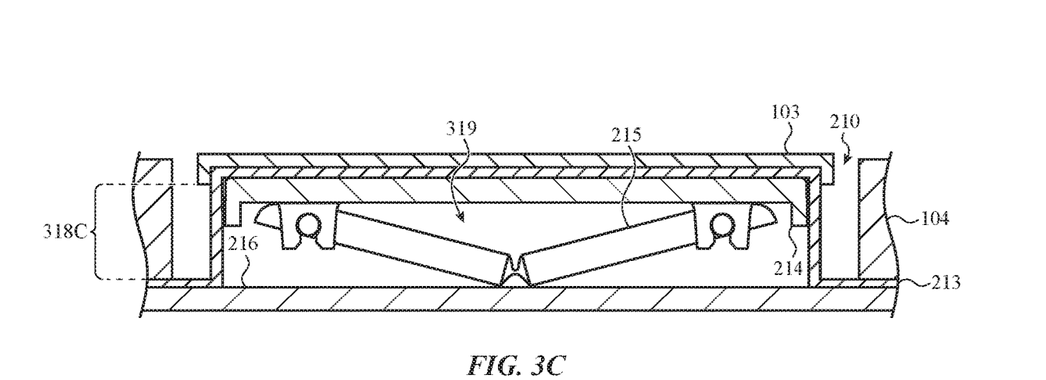
FIG. 3C depicts a second alternative example of the key assembly of FIG. 3A.

Although particular example sides 318A-318C are illustrated and described, it is understood that these are examples. In various implementations, variously configured sides of the raised portion of membrane 213 may be used.

Further, movement of the key cap 103 between undepressed and depressed positions or states may place the membrane 213 into compression and/or tension. For example, the embossed area or raised portion of the membrane 213 may not be in compression or tension when the key cap 103 is in the undepressed state. However, the key cap 103 moving towards the depressed position may then put the embossed area of the membrane 213 in compression.

By way of another example, the embossed area or raised area of the membrane 213 may be in tension when the key cap 103 is in an undepressed position, biased toward the undepressed position and kept in tension by the movement mechanism 215. When force is exerted on the key cap 103 to move the key cap 103 towards the undepressed position, the tension causes the embossed area of the membrane 213 to aid in moving the key cap 103 towards the depressed position. Essentially, the embossed area of the membrane 213 aids by pulling the key cap 103 downward until the embossed area of the membrane 213 is no longer in tension. In such cases, movement of the key cap 103 towards the depressed position may not put the embossed area of the membrane 213 in compression, or may put the embossed area of the membrane 213 in less compression than the example discussed above where the embossed area of the membrane 213 is not in tension when the key assembly is undepressed. The embossed area of the membrane 213 may be put in less compression as the key cap 103 movement may start to put the embossed area of the membrane 213 in compression after the key cap 103 already moves to where the embossed area of the membrane 213 is no longer in tension.

Thus, the key cap's 103 movement placing the membrane 213 into compression and/or tension influences how the membrane 213 affects the force curve response. This relationship may be configured accordingly to achieve different force curve responses.

Moreover, as described above, the web 104 and/or the substrate 216 constrain the membrane 213 (e.g., the unraised portion) but the membrane 213 may not be coupled to the web 104 and/or the substrate 216 at every point where the unraised portion of the membrane 213 contacts the substrate 216 and the web 104. Less coupling (such as shown in FIG. 2) causes the membrane 213 to affect the force curve response less than more coupling (such as where the membrane 213 is adhesively or otherwise bonded to both the substrate 216 by the web 104 at all contacting points). Thus, different amounts of coupling can be used to cause the membrane 213 to affect the force curve response differently.

Additionally, the embossed area of the membrane 213 may expand when the key cap 103 is depressed if unvented. The different configurations of sides 318A-318C result in the membrane 213 expanding in different configurations when the key cap 103 moves towards a depressed position or state. In some examples, expansion of the embossed area of the membrane 213 may direct contaminants in the aperture 210 away from the internal area 319, out of the aperture 210, and so on. Expansion may include putting the membrane 213 in compression, and thus affecting the force curve response.

Although the example key assemblies of FIGS. 3A-3C are illustrated and described as being unvented, it is understood that these are examples. In various implementations, one or more vents and/or venting mechanisms may be included.

Figure 3D:
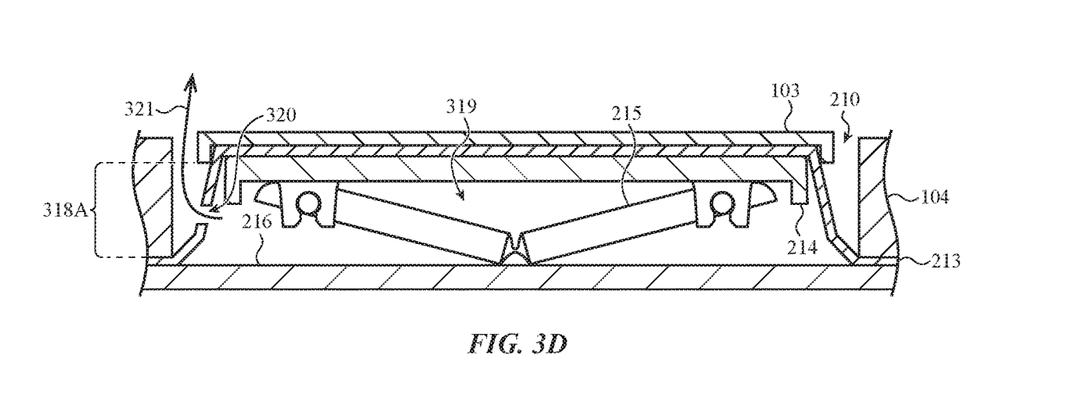
FIG. 3D depicts a third alternative example of the key assembly of FIG. 3A.

For example, FIG. 3D depicts a third alternative example of the key assembly of FIG. 3A. In this example, the membrane 213 or gasket defines a vent 320, aperture, or other hole in one of the sides 318A. When the key cap 103 is moved towards a depressed position, the membrane 213 compresses gas inside the internal area 319, forcing the gas through the vent 320. This allows the embossed area of the membrane 213 to act as a bellows mechanism, forcing gas in a direction 321. This may force contaminants away from the internal area 319 and/or out of the aperture 210. This may also reduce compression of the membrane 213, reducing how much the membrane 213 affects the force response. In various implementations, the vent 320 may be configured with sufficiently small dimensions that gas can be forced through the vent 320 without easily allowing liquids, dust, and/or other particles to enter the internal area 319 from the aperture 210.

Although this third alternative example illustrates and describes the key assembly externally venting through a vent 320 in the membrane 213, it is understood that this is an example. In various implementations, key assemblies may vent internally and/or may vent through holes, apertures, or other structures in components other than the membrane 213 and/or other portions of the membrane 213, such as one or more unraised portions.

Figure 3E:
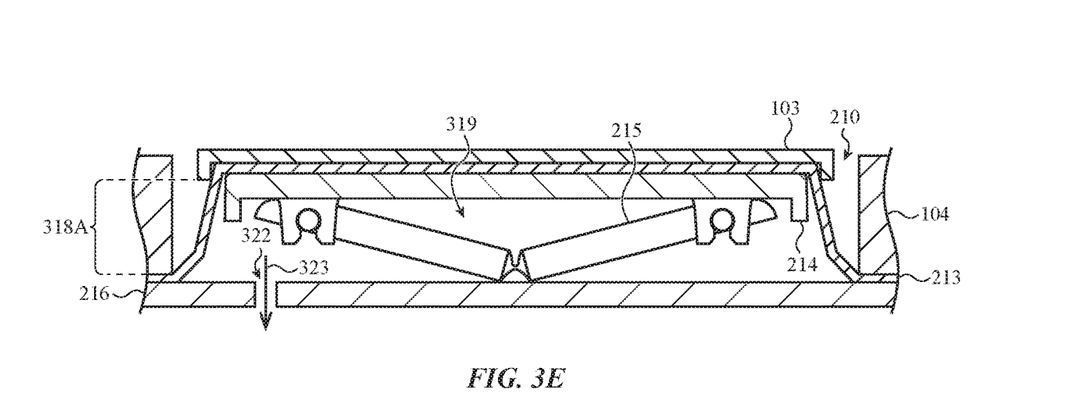
FIG. 3E depicts a fourth alternative example of the key assembly of FIG. 3A.

For example, FIG. 3E depicts a fourth alternative example of the key assembly of FIG. 3A that includes a hole 322 extending from the internal area 319 through the substrate 216, base, foundation, or the like. When the key cap 103 or actuator is moved towards a depressed position, the membrane 213 or gasket compresses gas inside the internal area 319, forcing the gas through the holes 322. This forces gas in a direction 323. This may force contaminants that have managed to enter the internal area 319 out into an internal volume of the electronic device.

FIGS. 2-3E illustrate and describe the membrane 213 or gasket as a single, uninterrupted sheet or other structure with the inner key caps 214 of the keys and the key caps 103 (functioning as outer key caps, key pads, or the like) coupled on opposing sides thereof. However, it is understood that these are examples and that other configurations are possible and contemplated without departing from the scope of the present disclosure.

Figure 4:
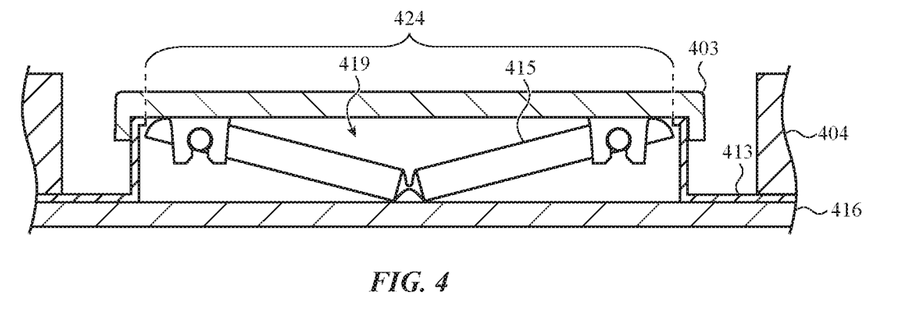
FIG. 4 depicts a second example cross-sectional view of a key assembly of the keyboard of FIG. 1, taken along line A-A of FIG. 1.

For example, FIG. 4 depicts a second example cross-sectional view of a key assembly of the keyboard 102 of FIG. 1, taken along line A-A of FIG. 1. The membrane 413 and the movement mechanism 415 couple directly to the key cap 403 or actuators rather than to any inner key cap. Further, the raised portion of the membrane 413 defines an aperture 424 between an interior surface of the key cap 403 and the internal area 419 of the key assembly. As the membrane 413 may be coupled to the key cap 403, the membrane 413 may still function as a barrier sealing the internal area 419 above the substrate 416 within the web 404 from an external environment despite the aperture 424 in the membrane 413.

However, it is understood that this is an example. The membrane 413 may be continuous in various implementations that do not use an inner key cap. In such implementations, the movement mechanism 415 and the key cap 403 may couple to opposing surfaces of the membrane 413.

Figure 5:
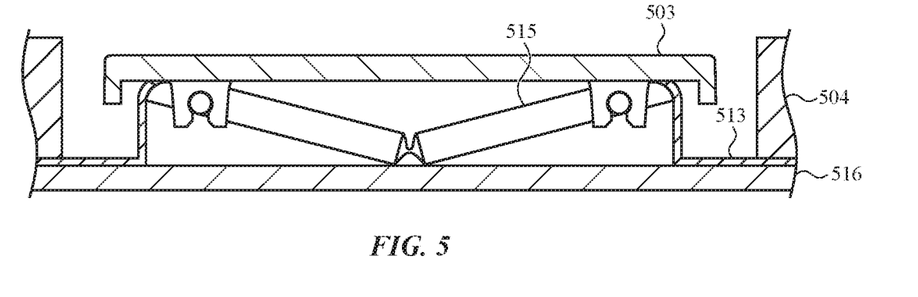
FIG. 5 depicts an alternative example of the key assembly of FIG. 4.

Further, in various implementations, the membrane 413 may not couple to the key cap 403. For example, FIG. 5 depicts an alternative example of the key assembly of FIG. 4. In this implementation, the raised portion of the membrane 513 couples to the movement mechanism 515 and the web 504 and substrate 516 rather than the key cap 503 or actuator.

Figure 6:
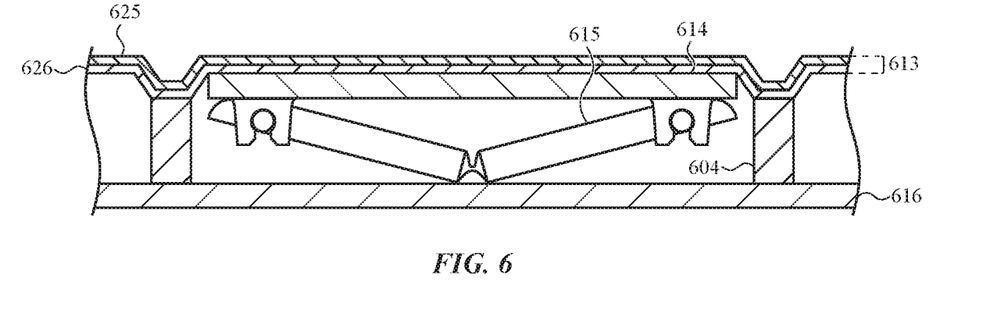
FIG. 6 depicts a third example cross-sectional view of a key assembly of the keyboard of FIG. 1, taken along line A-A of FIG. 1.

By way of another example, FIG. 6 depicts a third example cross-sectional view of a key assembly of the keyboard 102 of FIG. 1, taken along line A-A of FIG. 1, where the membrane 613 forms the external surface of the keyboard 102. In this example, the membrane 613 contacts (and may be bonded to) the top of the web 604 rather than being constrained between the web 604 and the substrate 616, base, foundation, or the like.

The membrane 613 includes a first layer 625 and a second layer 626. In this example, the first layer 625 is a layer of fabric (such as nylon, polyester, or the like) and the second layer 626 is an elastomer layer (such as silicone or the like). In this way, the membrane 613 may be waterproof while balancing other considerations such as texture, appearance, effect on force curve response, and so on. However, it is understood that this is an example. In various implementations, other membrane 613 configurations (and/or any of the other membranes 213, 413, 513 or associated structures discussed herein) are possible and contemplated.

For example, in some implementations, the membrane 613 may include more than two layers. In various implementations, the first layer 625 may be formed of elastomer and the second layer 626 may be formed of fabric. In still other implementations, the membrane 613 may include one or more layers of fabric coated or otherwise treated with one or more hydrophilic materials.

Further in this example, the key assembly includes the inner key cap 614 or actuator without the use of an external key cap. However, in various implementations, an external key cap, key pad, or the like may be coupled to the external surface of the membrane 613.

In various implementations, the keyboard 102 may include components that illuminate one or more of the key assemblies. For example, light emitting diodes and/or other components that illuminate may be positioned in the internal areas of key assemblies. Light from these components may be visible through the key assemblies, having traveled through one or more key assembly components in between.

For example, the key caps 103, 403, 503, 703 of the keys and/or portions thereof (such as areas forming a key legend, an area around a key legend, and so on) may allow the light to pass. Similarly, the inner key caps 214, 614 and/or the movement mechanisms 215, 415, 515, 615 and/or portions thereof may allow light to pass. In embodiments where the membrane 213, 613 may be positioned over a light source (as opposed to embodiments such as FIG. 4 where light may pass through the aperture 424 in the membrane 413), the membrane 213, 613 and/or portions thereof may allow light to pass. One or more of these components may include light guides and/or other elements that contribute to light evenly distributing as the light exits the key assemblies.

In various implementations where the membrane 213, 413, 513 forms side walls of an internal area of the key stack, inner portions of the membrane 213, 413, 513 may be reflective, treated with reflective material (such as a reflective coating), and/or may be otherwise configured to concentrate and/or direct the light out of the key assembly, prevent and/or reduce light leakage from the sides, and so on. The substrate 216, 416, 516, 616 (or base, foundation, or the like) and/or the web 204, 404, 504, 604 may be similarly configured in various embodiments.

Figure 7:
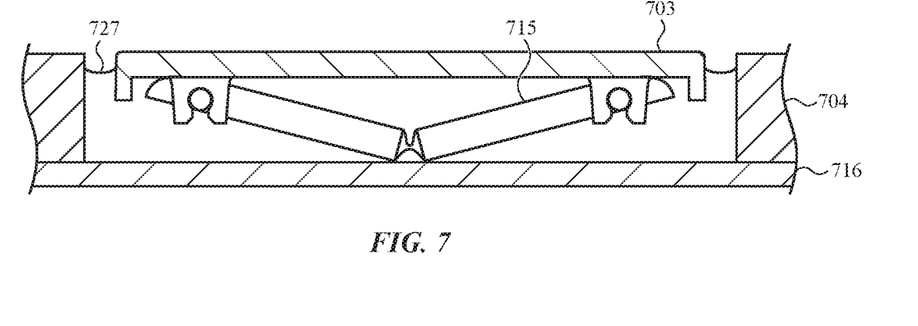
FIG. 7 depicts a fourth example cross-sectional view of a key assembly of the keyboard of FIG. 1, taken along line A-A of FIG. 1.

FIG. 7 depicts a fourth example cross-sectional view of a key assembly of the keyboard 102 of FIG. 1, taken along line A-A of FIG. 1. In this example, guard structures 727 block passage of contaminants into the keyboard 102 by occupying the gap between the key cap 703 or actuator and the web 704. The guard structures 727 may be coupled to the key cap 703, the web 704, and/or other components. The guard structures 727 may be one or more brushes, wipers, flaps, or the like formed of various flexible and/or inflexible materials such as rubber, silicone, and so on. The guard structures 727 may deform, flex, and/or otherwise move to maintain contact with the web 704 to prevent passage of contaminants into the key assembly.

Although, the web 704 is illustrated as having a solid surface parallel to the key cap 703 travel, it is understood that this is an example. In some implementations, the web 704 may include a cavity in a lower portion of the surface parallel to key cap 703 travel. Contaminants resting on the guard structure 727 may empty into such a cavity when the guard structure 727 is aligned with the cavity.

Figure 8A:
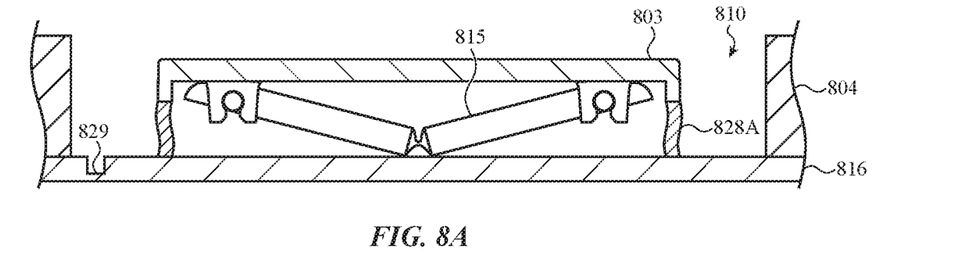
FIG. 8A depicts a fifth example cross-sectional view of a key assembly of the keyboard of FIG. 1, taken along line A-A of FIG. 1.
Figure 8B:
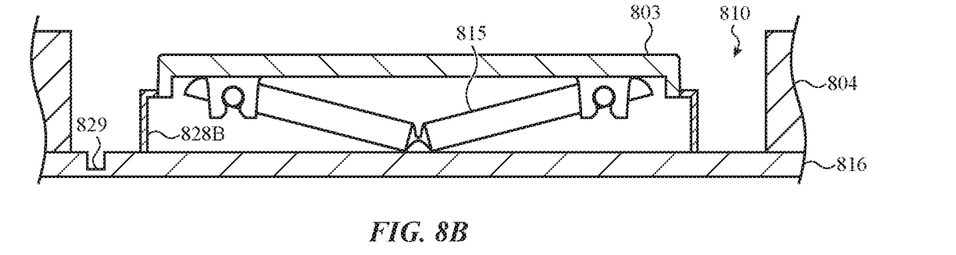
FIG. 8B depicts a first alternative example of the key assembly of FIG. 8A.

Although the embodiments illustrated and described in FIGS. 2-6 utilize a shared membrane 213, 413, 513, 613 in various implementations, one or more individual key assemblies (or groups of key assemblies) may include their own membranes for blocking contaminant ingress. For example, FIG. 8A depicts a fifth example cross-sectional view of a key assembly of the keyboard 102 of FIG. 1, taken along line A-A of FIG. 1 that includes a guard structure 828A coupled to an underside of the key cap 803 or actuator. As shown in FIG. 8F, the guard structure 828A is configured as a skirt, elastomer band, or the like that forms a perimeter around the key cap 803.

The guard structure 828A forms and maintains a seal between the key cap 803 and the substrate 816, base, foundation, or the like, blocking contaminant ingress. The guard structure 828A may be placed in compression between the key cap 803 and the substrate 816 when the key cap 803 is in an undepressed state and may be flexible so as to deform and allow the key cap 803 to move toward a depressed state. For example, the guard structure 828A may be formed by injection molding liquid silicone to the key cap 803.

The guard structure 828A may expand when the key cap 803 moves toward a depressed position, particularly when unvented. This expansion may drive contaminants out of the aperture 810 into cavities formed in the substrate 816 so the contaminants do not get under the key cap 803 and/or into the movement mechanism 815, blocking travel of the movement mechanism 815 and/or key cap 803 and so on.

As the guard structure 828A is placed in compression, the guard structure 828A may affect the force curve response of the key assembly (biasing the key cap 803 towards an undepressed position). Thus, the configuration of the guard structure 828A, the material from which the guard structure 828A is formed (thinner for less effect on the force curve response, thicker for more effect on the force curve response, more flexible for less effect on the force curve response, less flexible for more effect on the force curve response, more resistive to key cap movement 803 for more effect on the force curve response, less resistive to key cap movement 803 for less effect on the force curve response), whether or not the guard structure 828A is vented, and/or other such characteristics may be selected to adjust how the guard structure 828A affects the force curve response.

For example, the guard structure 828A is illustrated as coupled to the underside of the key cap 803 and extending to the substrate 816. By way of contrast, the guard structure 828B or skirt configured as an elastomer band of the key assembly of FIG. 8B is coupled to the sides of the key cap 803. The guard structure 828B extends toward the web 804 and then switches direction to form an approximately 90 degree angle with respect to the substrate 816 and extends toward the substrate 816. However, it is understood that this is an example and that in various implementations the guard structure 828B may be otherwise coupled, extend in different directions, and switch directions to form various angles other than approximately 90 degrees and with respect to other components other than the substrate 816.

Figure 8C:
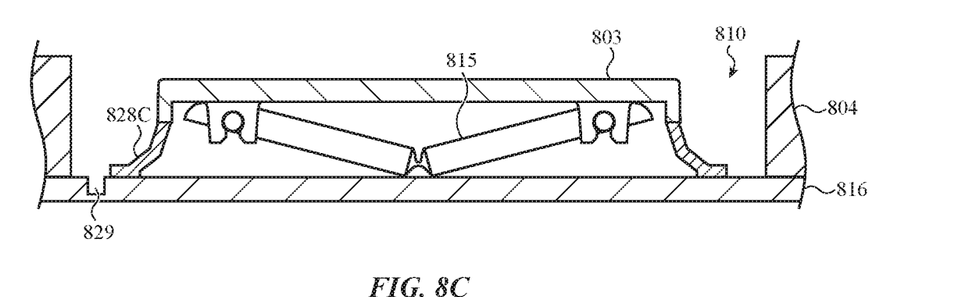
FIG. 8C depicts a second alternative example of the key assembly of FIG. 8A.
Figure 8D:
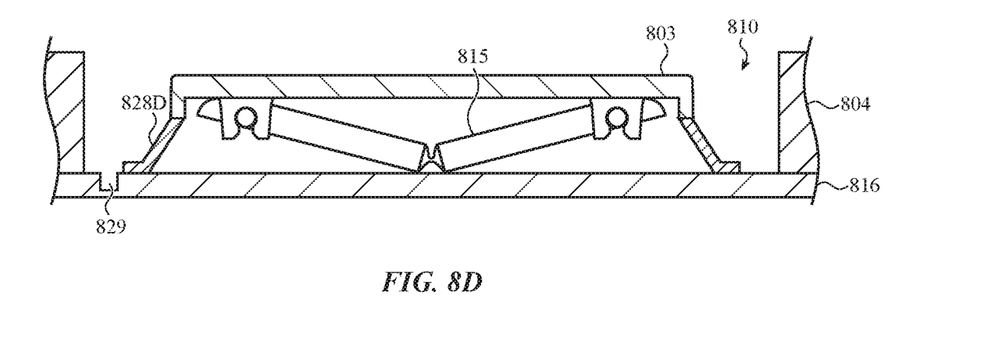
FIG. 8D depicts a third alternative example of the key assembly of FIG. 8A.

For example, FIG. 8C depicts a second alternative example of the key assembly of FIG. 8A having a guard structure 828C or skirt configured as an elastomer band. The guard structure 828C extends from the bottom of the key cap 803 to form an acute angle with respect to the substrate 816. The guard structure 828C then switches direction to form an acute angle with respect to the substrate 816 before meeting the substrate 816. By way of yet another example, the guard structure 828D or skirt configured as an elastomer band of FIG. 8D extends from the bottom of the key cap 803 to form an acute angle with respect to the substrate 816 and contacts the substrate 816 without switching directions.

The guard structure 828A may have the most effect on the force curve response of the guard structures 828A, 828B, 828C, 828D, and the guard structure 828B may have the least. Similarly, the guard structure 828C may have more effect on the force curve response than the guard structure 828B, but less than the guard structures 828A, 828D. Further, the guard structure 828D may have more effect on the force curve response than the guard structures 828B, 828C but less than the guard structure 828A. Thus, the configuration of the guard structure 828A may be selected to obtain the desired effect on the force curve response.

Figure 8E:
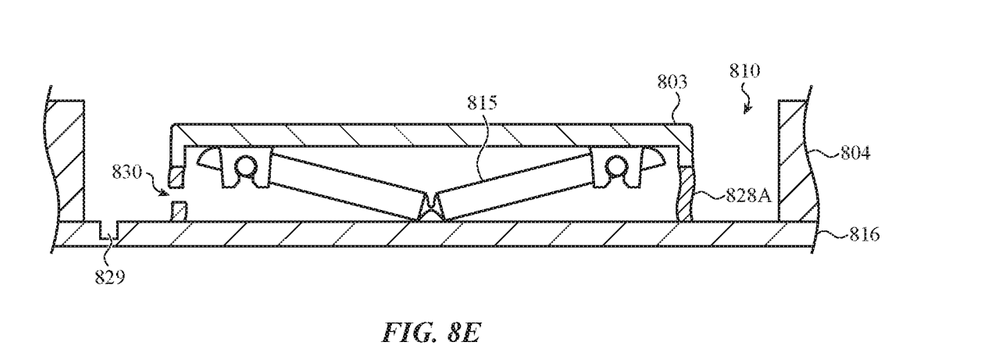
FIG. 8E depicts a fourth alternative example of the key assembly of FIG. 8A.
Figure 8F:
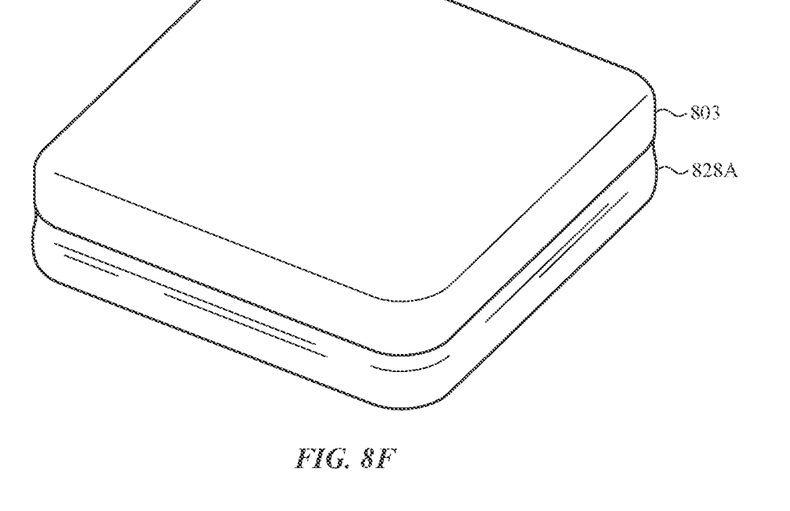
FIG. 8F depicts an isometric view of the key cap and guard structure of the key assembly of FIG. 8A with other components removed for clarity.

FIG. 8E depicts a fourth alternative example of the key assembly of FIG. 8A where the guard structure 828A or skirt configured as an elastomer band defines a vent 830, aperture, or other hole. When the key cap 103 is moved towards a depressed position, the guard structure 828A compresses gas inside the internal area of the key assembly, forcing the gas through the vent 830. This allows the guard structure 828A to act as a bellows mechanism, forcing gas out of the key assembly. This may force contaminants into the cavity 829, out of the aperture 810, and so on. This may also reduce compression of the guard structure 828A, reducing how much the guard structure 828A affects the force curve response. In various implementations, the vent 830 may be configured with sufficiently small dimensions that gas can be forced through the vent 830 without easily allowing liquids, dust, and/or other particles to enter the internal area of the key assembly from the aperture 810.

Although FIGS. 8A-8F illustrate a particular configuration and placement of the cavity 829 in the substrate 816, it is understood that this is an example. In various implementations, which may use or omit the guard structures 828A-828D or skirts, cavities in the substrate 816, holes through the substrate 816, and/or similar structures may be configured in a variety of locations in the substrate 816 and/or other structures. Such structures may alleviate issues caused by contaminant entry.

Further, although the embodiments illustrated and described with respect to FIGS. 7 and 8A-8F are illustrated and described as including particularly configured guard structures 727, 828A, 828B, 828C, 828D or skirts, it is understood that these are examples. Other guard structures may be used without departing from the scope of the present disclosure.

Figure 9A:
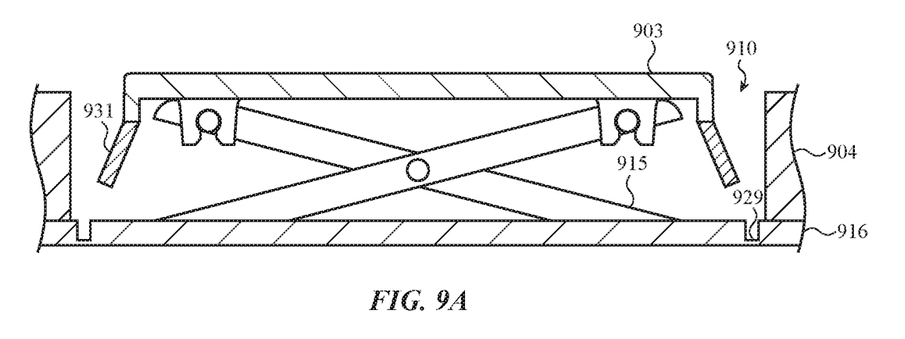
FIG. 9A depicts a sixth example cross-sectional view of a key assembly of the keyboard of FIG. 1, taken along line A-A of FIG. 1.

For example, FIG. 9A depicts a sixth example cross-sectional view of a key assembly of the keyboard 102 of FIG. 1, taken along line A-A of FIG. 1, including a guard structure 931 that may funnel and/or otherwise direct contaminants into cavities 929 in the substrate 916, base, foundation, or the like. This may prevent the contaminants from blocking movement of the key cap 903 or actuator and/or the movement mechanism 915.

Figure 9B:
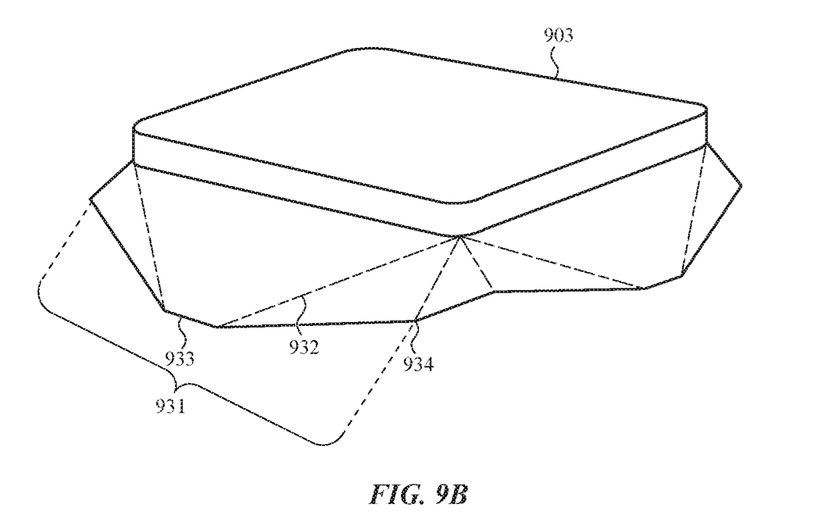
FIG. 9B depicts an isometric view of the key cap and guard structure of the key assembly of FIG. 9A with other components removed for clarity.

FIG. 9B depicts an isometric view of the key cap 903 and guard structure 931 of the key assembly of FIG. 9A with other components removed for clarity. The guard structure 931 includes a number of facets including side portions 934 disposed around lower center portions 932 so as to form a "funnel" shape. This allows the guard structure 931 to direct contaminants toward a mouth 933 where the lower center portions 932 meet the side portions 934.

With reference to FIGS. 9A and 9B, contaminants or other material landing on lower center portions 932 and/or the side portions 934 are directed down the guard structure 931 and off of the mouth 933 toward the cavities 929.

The guard structure 931 may form a perimeter around the key cap 903. Due to the guard structure 931 directing contaminants toward the cavities 929 via the mouth 933, fewer cavities 929 may be used than would otherwise be possible while ensuring contaminants are directed into cavities 929 rather than getting inside key assemblies.

In this example, the guard structure 931 may be positioned over the cavities 929 and not contact the substrate 916 during the full range of motion of the key cap 903 and the movement mechanism 915. As such, the guard structure 931 may be rigid, flexible, or otherwise without affecting performance, directing contaminants away from the key assembly. However, in other implementations, the guard structure 931 may be configured in different manners.

For example, in some implementations, the guard structure 931 may contact the substrate 916 either regardless of the motion of the key cap 903 or partway during travel of the key cap 903 from an undepressed to a depressed position. In such an implementation, the guard structure 931 may be flexible to accommodate such movement, may move at least partially into the cavity 929, and/or be otherwise configured to accommodate the movement.

In various embodiments, various key assembly components such as key caps of the keys may include flanges or other structures that engage flanges or other structures of webs or other keyboard components to block passage of contaminants into key assemblies. For example, FIG. 10A depicts a seventh example cross-sectional view of a key assembly of the keyboard 102 of FIG. 1, taken along line A-A of FIG. 1, where the web 1004 includes first flanges 1034 that interact with second flanges 1035 of the key cap 1003 or actuator.

The movement mechanism 1015 may bias the key cap 1003 towards an undepressed position. In the undepressed position, the movement mechanism 1015 may bias the second flanges 1035 against the first flanges 1034, forming a barrier against contaminant ingress.

However, the second flanges 1035 may move away from the first flanges 1034 when the key cap 1003 moves towards an undepressed position. This may allow contaminant ingress. As such, cavities 1029 or holes may be defined in the substrate 1016, base, foundation, or the like that are aligned with ends of the second flanges 1035. When contaminants ingress due to gaps formed between the first and second flanges 1034, 1035, the contaminants may fall into the cavities 1029 rather than lodge under the key cap 1003 and/or within the movement mechanism 1015.

Figure 10A:
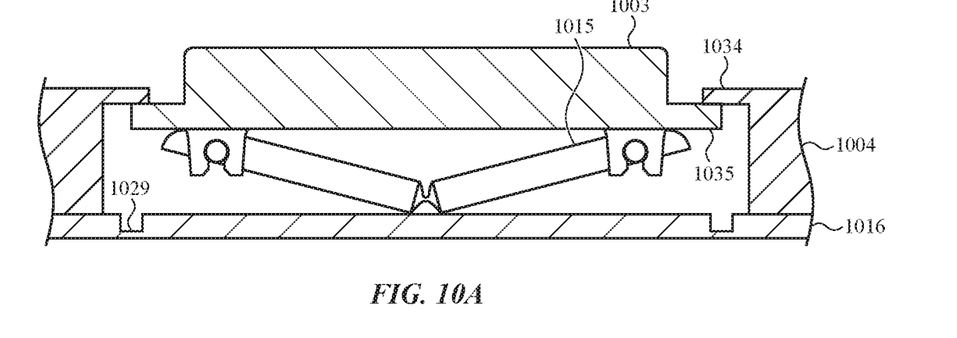
FIG. 10A depicts a seventh example cross-sectional view of a key assembly of the keyboard of FIG. 1, taken along line A-A of FIG. 1.
Figure 10B:
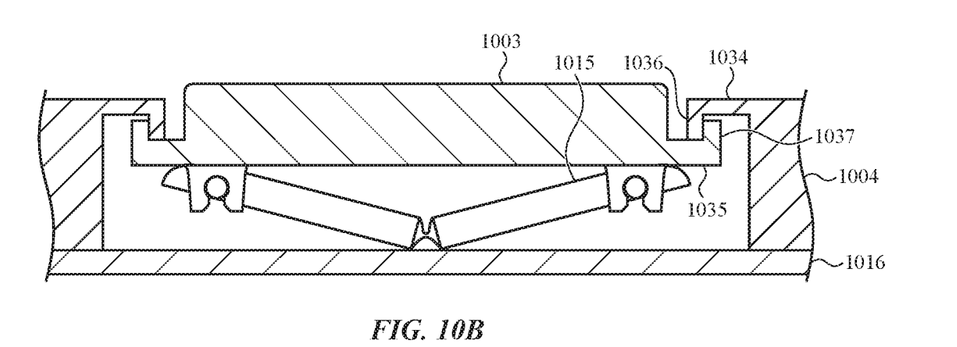
FIG. 10B depicts an alternative example of the key assembly of FIG. 10A.

By way of another example, FIG. 10B depicts an alternative example of the key assembly of FIG. 10A where the first flanges 1034 include a first protrusion 1036 that interacts with a second protrusion 1037 of the second flanges 1035. In this implementation, the first and second protrusions 1036, 1037 may travel with respect to each other to block contaminant ingress during part or all of motion of the key cap 1003. Thus, even though the first and second flanges 1034, 1035 cease blocking contaminant ingress during key cap 1003 motion, the first and second protrusions 1036, 1037 may continue to block.

In some implementations, the first and second protrusions 1036, 1037 may be configured with sufficient dimensions to block contaminant entry during all motion of the key cap 1003. However, in other implementations, the first and second protrusions 1036, 1037 may have dimensions that form a gap between the first and second protrusions 1036, 1037 when the key cap 1003 travels a sufficient distance toward the substrate 1016.

Although particular contaminant ingress prevention and/or alleviation mechanisms have been illustrated and discussed above with respect to FIGS. 1-10B, it is understood that these are examples. One or more of the contaminant ingress prevention and/or alleviation mechanisms illustrated and discussed above with respect to FIGS. 1-10B may be combined without departing from the scope of the present disclosure. Further, other contaminant ingress prevention and/or alleviation mechanisms may be used and/or combined with one or more of the contaminant ingress prevention and/or alleviation mechanisms illustrated and discussed above with respect to FIGS. 1-10B without departing from the scope of the present disclosure.

For example, in some implementations, key assembly movement mechanisms may include one or more crushing components, such as knobs, spikes, and the like. If contaminants such as chip crumbs reach internal areas of key assemblies, the contaminants may be broken down by the crushing components during motion of the key assemblies. This may prevent the contaminants from blocking key motion. Cavities, holes, or other features may also be combined with such implementations so that the crushed contaminants may be able to exit the internal areas. In implementations using bellows elements, forced gas may blast the crushed components from the internal areas.

By way of another example, in some implementations, the electronic device that includes the keyboard 102 may include one or more fans, such as one or more cooling fans. Air from these fans may be directed to blast contaminants away from key assemblies and/or to prevent contaminant ingress into key assemblies. In other implementations, similar functions may be performed by various transducers, actuators, vibrators, or other such components. For example, speaker membranes and/or haptic actuators (such as a haptic trackpad) may be vibrated to dislodge contaminants from key assemblies. By way of other examples, acoustic devices may resonate at frequencies that break up lodged contaminants and/or drive contaminants away from key assemblies.

In other examples, hollow passageways may connect key assemblies to an external port. Compressed air or other gas may be forced into the port to blast contaminants out of the key assemblies.

By way of other examples, contaminants like dust may be electrically charged. Substrates and/or other components may be operative to oppositely charge, driving the contaminants from key assemblies. For example, a keyboard 102 may emit an electrostatic discharge to drive out dust or other contaminants.

In still other examples, various combinations of hydrophobic and/or hydrophilic coatings may be disposed on surfaces around apertures between key assemblies and keyboard webs. These coatings may prevent ingress of liquid, guide liquid ingress towards exits, and so on.

In yet other examples, the liquid seals provided by membranes or other guard structures may allow solvents or other liquid cleaners to be applied to a keyboard. The liquid seals may prevent the solvents or other liquid cleaners from damaging sensitive keyboard components while the solvents or other liquid cleaners break up and/or remove dust, dirt, sugars or other residues, and/or other contaminants that have lodged in various areas of the keyboard.

In still other examples, heating elements may be included. These heating elements may liquefy residues, such as sugars, that have lodged in a keyboard. Once liquefied, the residues may be able to exit the keys or the keyboards. In other examples, the heating elements may evaporate or burn off residues and/or other contaminants rather than liquefying the residues and/or other contaminants.

By way of other examples, gaskets may extend between key caps of the keys. These gaskets may be formed of rubber, elastomer, and/or other flexible materials and may block entry of contaminants into key stack assemblies.

Although the contaminant ingress prevention and/or alleviation mechanisms are illustrated and discussed above with respect to keys or key assemblies and keyboards, it is understood that these are examples. In various implementations, one or more of the mechanisms discussed herein may be utilized with other devices without departing from the scope of the present disclosure.

Further, the movement mechanisms 215, 415, 515, 615, 715, 815, 915 are illustrated as a representative structure (movement mechanisms 215, 415, 515, 615, 715, 815 illustrated as butterfly mechanisms and movement mechanism 915 illustrated as a scissor mechanism). It is understood that any movement mechanism or structure may be used. Living hinge structures, butterfly mechanisms, scissor mechanisms, spring mechanisms, and the like are all examples of suitable movement mechanisms that may be incorporated into various embodiments.

Additionally, the electronic device 100 of FIG. 1 is illustrated as a laptop computing device with an incorporated keyboard 102. However it is understood that this is an example. In various implementations, the electronic device 100 may be a variety of different electronic devices with internal and/or external keyboards and/or other input devices. For example, in some implementations the electronic device 100 may be an external keyboard. By way of other examples, the electronic device 100 may be a phone, a desktop computing device, a digital media player, a display, a printer, and so on.

As described above and illustrated in the accompanying figures, the present disclosure relates to keyboards and/or other input devices that include mechanisms that prevent and/or alleviate contaminant ingress. These mechanisms may include keyboard membranes or gaskets; structures such as brushes, wipers, or flaps in gaps between key caps of the keys; funnels, skirts, elastomer or other bands, or other guard structures coupled to key caps; bellows that blast contaminants with forced gas; and/or various active or passive mechanisms that drive contaminants away from the keyboard and/or prevent and/or alleviate contaminant ingress into and/or through the keyboard.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A keyboard assembly, comprising:
a base;
a key cap;
a movement mechanism having a first portion coupled to the base and a second portion coupled with the key cap, the movement mechanism facilitating movement of the key cap relative to the base; and
a guard structure configured to deform in response to movement of the key cap, the guard structure having a portion positioned between the key cap and the movement mechanism, the portion of the guard structure being in direct contact with a portion of the movement mechanism, the guard structure extending beyond a perimeter of the key cap, the guard structure having an aperture through which a portion of the keycap extends to couple the keycap to the second portion of the movement mechanism.

2. The keyboard assembly of claim 1, wherein the base defines a cavity and the guard structure funnels the contaminants into the cavity.

3. The keyboard assembly of claim 1, wherein the guard structure surrounds the key cap.

4. The keyboard assembly of claim 1, wherein the movement mechanism includes a butterfly mechanism.

5. The keyboard assembly of claim 1, wherein the guard structure does not contact the base when the key cap is in a depressed position.

6. A keyboard, comprising:
a base;
a web that defines a set of apertures;
a butterfly mechanism coupled with the base;
a key of a set of keys coupled to the butterfly mechanism and positioned within a respective aperture of the set of apertures; and
a gasket comprising:
 a raised portion positioned between a key cap of the key and the butterfly mechanism, the raised portion being in direct contact with a portion of the butterfly mechanism, a gasket aperture being formed in the raised portion, wherein a portion of the key cap extends through the gasket aperture; and
 an unraised portion fixed between the web and the base.

7. The keyboard of claim 6, wherein the gasket comprises a layer of fabric and a layer of silicone.

8. The keyboard of claim 6, wherein the gasket comprises a membrane.

9. The keyboard of claim 6, wherein the gasket resists depression of the key.

10. The keyboard of claim 6, wherein the unraised portion includes:
a first region fixed between the web and the base that is coupled to the web and the base; and
a second region fixed between the web and the base that is uncoupled from the web and the base.

11. A key, comprising:
a base;
a key cap;
a movement mechanism having a first portion coupled with the base and a second portion coupled with the key cap, the movement mechanism facilitating movement of the key cap relative to the base;
a guard structure configured to deform in response to movement of the key cap, the guard structure having a portion positioned between the key cap and the movement mechanism, the portion of the guard structure being in direct contact with a portion of the movement mechanism and defining an aperture, wherein a portion of the key cap extends through the aperture to couple the key cap to the second portion of the movement mechanism.

12. The key of claim 11, wherein the guard structure includes a raised portion and an unraised portion, and wherein the aperture is formed in the raised portion.

13. The key of claim 11, wherein the guard structure forms a perimeter around the key cap.

14. The key of claim 11, wherein the guard structure is coupled to the movement mechanism.

15. The key of claim 11, wherein the guard structure is coupled to the key cap.

16. The key of claim 11, wherein the guard structure includes a sloped surface that slopes from an edge of the key cap toward the base.

17. The key of claim 11, wherein another portion of the guard structure is positioned between a web structure and the base.

18. The key of claim 11, wherein the guard structure includes an end that is unconnected to another structure.

* * * * *